Oct. 20, 1931.    R. E. NAUMBURG    1,828,198
APPARATUS FOR TRANSLATING IMPRESSIONS
Filed Aug. 5, 1927    2 Sheets-Sheet 1

Inventor
Robert E. Naumburg,
by Roberts Cushman & Woodberry
Attys.

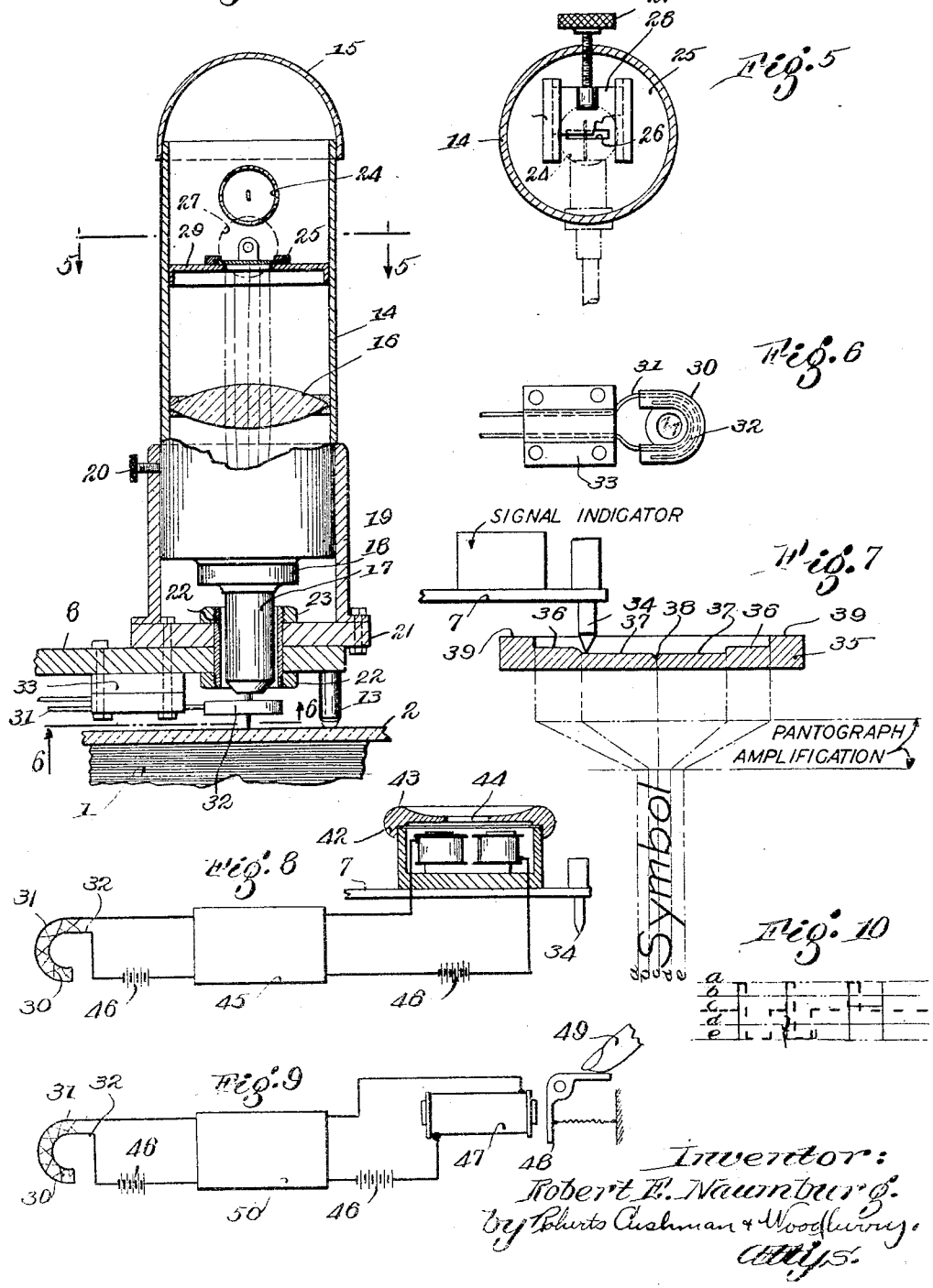

Patented Oct. 20, 1931

1,828,198

UNITED STATES PATENT OFFICE

ROBERT E. NAUMBURG, OF WINCHESTER, MASSACHUSETTS

APPARATUS FOR TRANSLATING IMPRESSIONS

Application filed August 5, 1927. Serial No. 210,888.

The invention relates broadly to the class of instruments by which appreciation of the shape of certain characteristics of an object, due to the effect of light either emitted by, or reflected from or transmitted through the object, may be obtained by the sense of hearing or touch. One application of my device finds adaptation in the enablement of a person, blind or blind and deaf, to comprehend with ease and despatch characters, letters, symbols, maps or other indicia, derived from printed or written subject matter or other forms of primary impressions. The invention also lends itself readily to discernment of various colors and shades employed in the arts of printing, photography, illustration, etc.

Heretofore, it has been proposed to subject different portions of each character or impression, usually struck off along the vertical median of the character, to a number of periodically varying light beams having frequencies within the audible range and allowing the light reflected or diffused by the scanned matter to affect an integrating indicator or make its effect known by a combination of sounds. In thus combining the various light effects in terms of electrical and/or mechanical undulations to reconstruct the letter image, the operator adduces a general impression of the character as a whole. This method has not received favor primarily because the criteria of the various symbols, each represented by a composite sound, chord, or impulse, is extremely difficult even for those experienced, for not only must the component frequencies be individualized but it is necessary to consider the particular portion of character affected by each periodicity of light ray. These mental operations may be performed only by retrospect. Another disadvantage is the fact that when the register of a character is not clear, e. g. an imperfectly formed letter, its component impulses follow too rapidly for individual analysis or scrutiny and there can be no re-examination of a single portion of the letter in question by its individual light ray to the exclusion of the remaining portions; the character must be repeated as a whole, as before. Moreover, prior devices fail to offer a ready and infallible means for indentifying the same letter or character occurring in the various print types.

The apparatus forming the subject of the present invention, and which I term a Visagraph, eliminates practically all of the foregoing defects. It relies for effectiveness, not upon a plurality of notes sounded as a chord to denote a character in toto, but rather upon a series of indications rendered successively at the receiver and which represent the cardinal points along a given locus of the graph, letter or outline. The points are preferably established according to a fixed guide and distinguished by the presence or absence of a signal, an operation requiring the minimum of intelligence and experience.

The primary object of my invention is to provide an arrangement for translating in simple and effective manner, impressions derived from printed or written characters or other color phenomena into sound undulations or mechanical vibrations. Other objects are to devise apparatus permitting persons totally blind or having defective eyesight to read ordinary print or letter press, making all the necessary preliminary and operating adjustments; to offer ready adaptation to the various styles and size of letters; to improve the manner of reception and discrimination of the various components which represent in aggregate a character, symbol or word; to provide a device which lends accuracy in registering notwithstanding flexibility of control and has a rapidity of operation commensurate with the skill and experience of the operator; to improve the manner of moving the scanning beam or ray from line to line and assuring its faithful travel within a compass to include all parts of every character contained in a reading line or other apportionment of the subject matter; to provide an improved arrangement for focusing and rendering constant the distance between the light source and surface of reflection and in general to improve the art of optometry.

On the drawings, which represent preferred embodiments of the invention, similar reference characters designate corresponding elements throughout the several views.

Fig. 4 is a view partly in section of the optical system including the light source and light responsive element;

Fig. 5 represents a section taken along line 5—5 of Fig. 4 and exemplifies a preferred arrangement of regulating one dimension of the light beam;

Fig. 6 illustrates the light responsive unit or cell as seen in the direction of arrows from line 6—6, Fig. 4;

Fig. 7 is a cross-sectional view of the guide with the pointer in place, also showing a representative character useful in explaining the operation;

Fig. 8 is a schematic view of an electrical system connecting the light responsive device and the indicator; and Fig. 9 is a modified circuit.

Fig. 10 is a graph exemplifying a typical mode of identifying each character.

Figure 1:
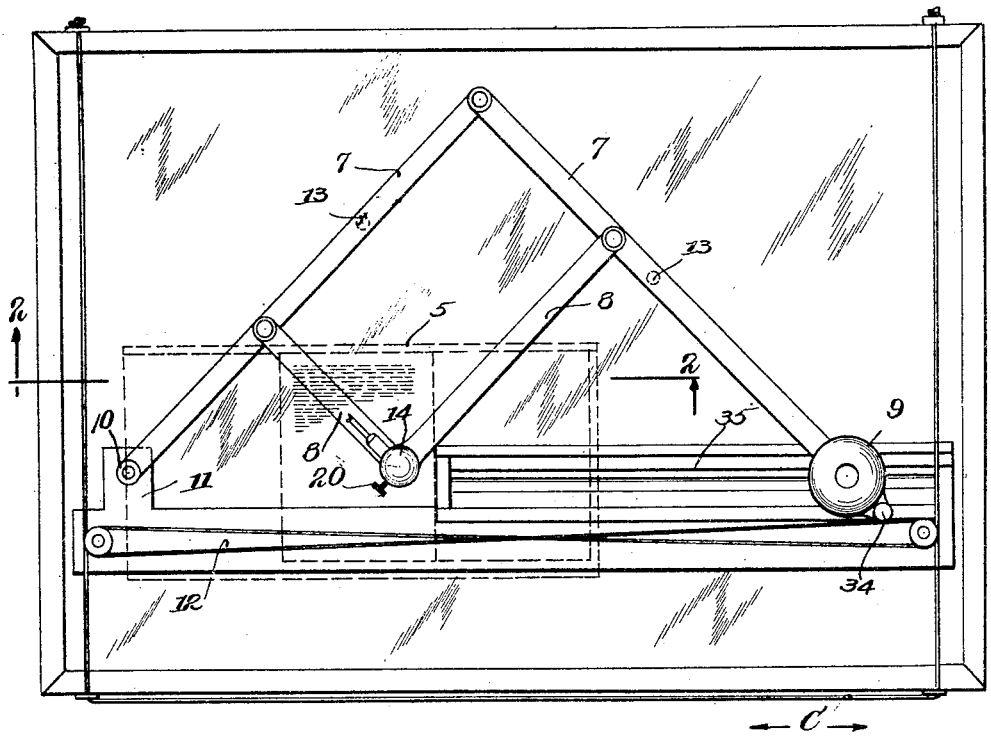
Fig. 1 illustrates in plan the structural assembly including the reading matter or primary impression, movable light source and the vibratory indicator.
Figure 2:
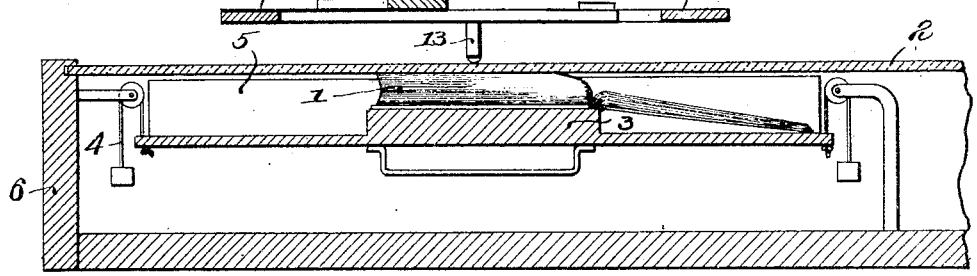
Fig. 2 is an enlarged view taken along line 2—2 of Fig. 1 showing in cross-section the support for the reading matter and in elevation, a portion of the translation mechanism.

Referring to the drawings, numeral 1 represents the object from which the primary impression is derived, e. g., a book page, sheet of correspondence, a colored illustration or group of characters, symbols or outlines. In order to present a flat surface to the projected light beam and spaced from the latter a fixed distance, the object is pressed upwardly against a sheet 2 of material permeable to light, e. g. glass, and held firmly in place by support or book rest 3 to which is applied a pressure in any suitable manner, e. g., pulley and counterweight arrangement 4 or springs giving the effect of a floating base or cradle. In order to facilitate the placing and to fix the location of the object to be read with respect to the support, I provide a bar or stop 5 extending along the upper edge of the latter and secured thereto. The glass plate 2 is held rigidly in a box frame comprising members 6; the plate furnishes a hard, smooth and frictionless surface over which the translating mechanism may travel with ease. This mechanism or carriage preferably takes the form of pantograph including two pairs of arms 7, 8 pivoted together in parallel relation, one pair being shorter than the other to produce an amplified ratio of motion, although any desired ratio may be obtained even to the extent of a reducing factor. At the intersection of arms 8—8, there is located a vertically extending compartment or casing containing a light source, a group of lenses, a projector and a light responsive device, all of which I include under the head of "optical unit" and shown more clearly in Fig. 4. One of the longer pair of arms terminates in a combined indicator and tracing unit 9 referred to hereinafter as the "feeler" while the remaining arm is fixed at the free or unpivoted end 10 to a sliding beam 11. The latter, which preferably extends the whole width of glass plate, is free to move over the glass surface in a direction defined by one dimension of the character group deriving an equal travel throughout its length by means of a parallel mechanism, e. g., the cord and pulley arrangement 12 commonly employed for straight-edge work on a drafting table or the ratchet spacing mechanism utilized in typewriter construction. In addition to being supported horizontally from beam 10, the pantograph is also spaced from glass plate 2 by pins 13—13 (Figs. 1 and 4).

The optical or scanning arrangement shown in Fig. 4 comprises a compartment or casing 14 of suitable shape, e. g. cylindrical, closed at one end by a hemispherical cap 15. The other end terminates in one or more condensing lenses 16 and a tubular projector 17 beveled at the muzzle; the projector is spaced from the casing by circular plate 18. The casing is adjustably held in an upright position by vertical housing 19 flanged at the bottom and secured to arm 8 in any suitable manner. In order to focus the beam of light on the reading material drawing it down to a fine pencil, the housing should have interior diameter sufficient to allow a sliding movement of the casing; the vertical position of latter is fixed by thumbscrew 20. Between arm 8 and the housing flange, a circular plate 21 may be provided to assure stability of support. Through arm 8 and the abutting plate, in axial alignment with projector 17, there is a circular aperture lined with tubular member 22 of bore sufficient to loosely accommodate the projector; the tube may be secured against longitudinal movement by nuts 23—23.

For a source of light, I may employ an incandescent filament lamp 24, Nernst glower or other radiant body energized by direct current or pulsating or alternating current of audible frequency, e. g. 60 cycles. The lamp is secured to the container or casing in suitable manner. Interposed between the light source and the nearest lens, there is located a shutter mechanism 25 having an opening 26 commensurate with the portion of light beam exhibiting equal intensity. In case a lamp having a single elongate filament is employed, which is preferred, the filament should extend transversely of the slot 26 as shown in Fig. 5 so as to provide in effect a point source. The width of opening 26 may be adjusted by thumb screw 27 which operates to slide plate 28 through lateral grooves over metallic support 29.

Numeral 30 designates an arrangement for translating changes of light intensities into mechanical, electrical or acoustical vibrations. For this member I prefer a device having a specific conductivity to electrical energy which changes in response to light variations, e. g. a photoelectric cell or preferably a selenium bridge. While various ways of constructing the bridge will suggest themselves to those skilled in the art, I propose to simply bury the lead-in wires 31—31 (Fig. 6) in a mass of selenium 32, concentrically disposing the unit about the opening in projector 17. It is apparent that selenium crystals held under pressure between two contacts will suffice. The unit may be conveniently supported from the pantograph by cleats 33 of insulation which in addition, serve as a wire duct.

The indicating member or "feeler" 9 comprises any instrument actuated by mechanical or electrical force, having a response representing an accurate measure of changes in energy transmitted therethrough and of sufficient delicacy to enable the response to be readily detected either by the sense of touch or hearing or both. For this member I prefer an electrically operated device, which may take the form of a modified telephone receiver, or mechanically biased or polarized telegraph sounder or a buzzer; certain of these forms are described later in connection with Figs. 8 and 9. Secured to the pantograph arm containing the indicator, there is a downwardly extending pointer 34 shown in Figs. 1, 7 and 8, which during operation, travels over a guide member 35; the pointer may extend also on the upper side of the arm to furnish a projection to grasp in moving the pointer. The guide member constitutes a metallic plate recessed along its length according to a predetermined design. Ordinarily this member is adapted to move over the glass surface in the same direction and amount as the slidable bear 11; for simplicity of construction, the guide may be detachably mounted on the beam. As shown in Fig. 7, there is a portion 36 countersunk to considerable depth and a central portion 37 of a slightly deeper level and extending the whole length, down the middle, a scratch or groove 38 is made having a purpose explained hereinafter. The portion of less depth is contained between two walls 39 which serve as lateral stops to the movement of the pointer or tracer at lines $a$ and $e$ (Fig. 7). Between levels 36 and 37 are shoulders as indicated at $b$ and $d$ in Fig. 7. One or both of these shoulders may be rounded as shown at $b$, although I prefer the upper shoulder $b$, which is frequently traversed, to be rounded, and the lower shoulder $d$, which is seldom traversed, to be sharp. Across each end of the guide I may provide a strap 40 having width comparable to that of the longitudinal walls or, if desired, the countersunk or recessed portions may be cut only to points intermediate the ends, forming the straps integral with the guide material. Fitting within the grooves, there is a sliding bar 41 adapted to move the entire length of the recess and having the function of assuring a vertical movement of the pointer. Thus the horizontal guide 35 is fixed with relation to the support 11 for the tracer (the optical unit 14 in the illustration) and the guide 41 is movable relatively to this support.

Figs. 8 and 9 illustrate broadly typical circuit connections between the light responsive cell and the vibration indicator. In Fig. 8, the load constitutes a telephone receiver 42 of standard design with the exception that ear-piece 43 has an opening therein 44 sufficiently large to accommodate the tip of one of the fingers. Between the cell and load, I prefer to insert an amplifier 45 capable of repeating relatively small amounts of energy, e. g. a thermionic device or transformer. The circuit, prior and subsequent to the amplifier may be energized by source 46 of alternating current having frequency above audibility although I prefer direct current. Figure 9 represents the preferred system and has for a load an electromagnetic register, similar to a telegraph sounder but which transmits its indications through the sense of touch. It comprises an electromagnet 47 responsive to the changes of current through the selenium cell and operates on a spring-biased bell-crank armature 48 pivoted at the middle. By numeral 49, the outline of a finger is designated. As in the other circuit, an amplifying device is desirable; however, a relay 50 capable of handling a relatively large amount of energy, or the combination of a relay and amplifier if necessary.

To operate the Visagraph, the operator, who may be blind or have impaired vision, first inserts the reading material between the glass plate and movable base and against horizontal stop 5, allowing the counterweights to raise the floating structure. The horizontal beam 11 and attached guide member are moved up and down the glass surface until the light rays strike the first line of characters or primary impression as shown by the response in the indicator. During this act the pointer preferably rests against the sharp shoulder $d$ on level 37 of the guide member 35. Under these conditions, the light which ordinarily is reflected from the white background to the selenium, reducing its resistance, is absorbed by the black outline of the character or letter, at which time the selenium acquires its higher normal resistance and changes the amplitude of the current flowing serially therethrough. If the lamp is energized by alternating current or interrupted direct current, the indications are noted by way of a reduction in the amplitude of, or a total absence of, the 60 cycle hum or other periodic characteristic of the supply voltage. The reduction of current amplitude may be discerned by the change in sound or note or its effect adjudged by feeling the mechanical vibrations resulting therefrom, termed the secondary impression. In the first method the ear-phone is used in conventional manner, whereas in the other case the operator inserts a finger tip into the opening of the ear-piece (preferably attached to the pantograph near the pointer 34) and notes the position and/or movement of the diaphragm. It is a well known physiological fact that persons afflicted with loss of sight develop an acuity of touch. The preferred method of receiving the signals, when employing direct current, is shown in Fig. 9, where the operator holds his finger a short distance away from the horizontal arm of the bell crank lever. When the light passes over the white background, the armature is attracted by electromagnet 47 but released under the action of the spring when the black is in line with the light ray giving the finger the impression of a raised black letter. After receiving the indication by one of the foregoing methods or in any other manner, the operator slides bar 41 against the pointer; the latter is moved along the juxtaposed edge of the bar noting by means of the impulse indicator the upper and lower extremities of the character.

Figs. 7 and 10 indicate the relation between the guide 35 and the letters to be read, the line c corresponding to the horizontal center line of small letters such as m, the line b to the top of such letters, the line d to the bottom of such letters, the line a to the top of capital letters such as S and some small letters such as b and l, and the line e to the bottom of small letters such as y which extend below the line d.

Figure 3:
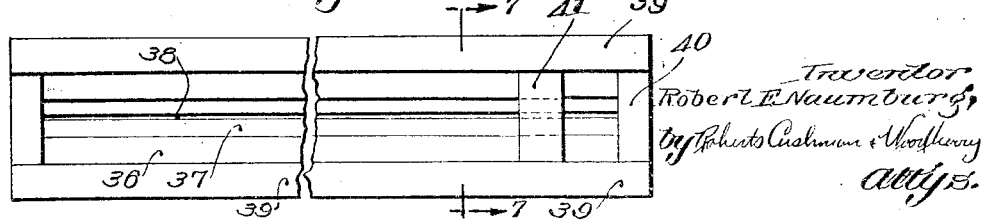
Fig. 3 illustrates a guide member useful in locating the letters.

The best way I have found to read a line of letters according to this invention is in general to follow with the tracing beam or ray, a path such as indicated by broken lines in Fig. 10. Thus to approach a letter the pointer 34 is moved along the groove 38 so that the tracing beam follows line c. When an indication is received indicating that a letter hass been reached, the sliding guide 41 (Fig. 3) is brought up against the pointer, the latter then being moved upwardly until the top of this vertical line is reached, that is to the shoulder of guide 35 corresponding to line a in the case of some capital letters, such as I, L and H. The pointer, resting against the shoulder a, is then moved to the right a distance sufficient to indicate whether the letter has a horzontal line at the top and if so how far it extends. If the letter is of the type having a short cross line at the top of letters such as I and L, this horizontal movement should be slightly more than enough to indicate whether the cross line is that of an I or L or a longer cross line of a letter like T, E, F, etc. The guide 41 is again brought up to the pointer 34. The next movement may then be downwardly along the guide 41 far enough to indicate the number and location of the cross lines below the top. For example, I would have no cross lines below the top; F would have one at or near the line b coresponding to the rounded shoulder on guide 35; E would have a third cross line at the bottom; L would have only one at the bottom; H would have only one at or near the line C; etc. At the termination of one row or line, the pointer is moved preferably to the sharp-cornered step or shoulder d as before, the moving beam and attached guide being pushed along the glass plate until the base line of the succeeding row registers by the characteristic hum or impulse in the indicator. While this is the preferred method of exploration, it will of course be understood that other methods may be employed depending upon the characters of the indicia to be read, and the reader.

It is evident that when analyzed in this manner, each letter produces a different combination of impulses considered as a whole; moreover, the speed with which each portion of character, the whole character, word, line and page is electrically dissected is entirely under the control of the operator and commensurate with his skill and experience. In case of lines regularly spaced, a mechanical linkage operated in any suitable manner, e. g. a ratchet device rotated by hand lever may be provided if desired, to reduce or entirely eliminate the step of finding successive lines; however, the utility of such an arrangement is limited. In the event that the line of type is not parallel to the edge of the book placed against the stop 5, a suitable adjustment of the guide member or preferably the moving beam can be made as by pulling the cord C (Fig. 1) of the parallel mechanism. In the case of type or other outline, having marked dissimilarity of individual character, a special guide may be provided; indeed, by specific patterns, designs, levels of recesses pertaining to the guide member, my apparatus is enabled to follow and translate faithfully all the intricacies of any outline or contour whether flat or spherical.

While I have explained the operation of my invention with respect to black characters or outlines on white background, it is apparent that by suitable change of the indicating mechanism, the Visagraph may denote excursions from a black background to white type.

The present invention finds pronounced utility in the arts for critically examining and analyzing a gradation of colors or shades. This adaptation is of practicability to those of sensitive touch or hearing irrespective of the presence or absence of sight. Each color upon being subjected to the scanning light beam will register at the indicator an impulse whose amplitude is in direct proportion to the contrast between the color selected and the white or black standard, thus gray, for example, which is intermediate between black and white, responds in an individual manner.

The Visagraph not only provides the blind with a practical means of reading ordinary books, magazines and newspapers, but enables them to study geometric figures, maps and other drawings, and also to obtain the sensation of differences in colors or shades.

I claim:

1. In the art of enabling the blind to read ordinary type, the method of letter analysis which comprises dissecting the letter along two or more rectilinear lines extending in different directions and modifying electrical current in accordance with the lines traversed or cut in either direction in an order controlled by the blind operator whereby the letter is identified.

2. Apparatus for reading a primary impression comprising means for translating the impression into a secondary impression, said means comprising an optical system arranged for reciprocation in at least two dimensions over the primary impression and electrical means responsive to light of the optical system for manifesting the secondary impression.

3. Apparatus for reading a primary impression comprising means for translating the impression into secondary impression, said means comprising an optical system and a light responsive device in juxtaposed relation thereto and arranged for reciprocation in at least two dimensions over the primary impression and electrical means responsive to light of the optical system for manifesting the secondary impression.

4. In combination, a group of characters, means for playing a light ray on each character at various points thereof along a devious path whereby reflected impulses are derived, means for manually controlling the rate of ray movement from point to point and for translating the impulses into mechanical undulations.

5. Apparatus for reading a primary impression comprising means for translating the impression into a secondary impression, said means comprising a pantograph arrangement containing an optical system movable over the primary impression, a light responsive device in the path of the optical system and an impression indicator responsive to said device.

6. In a device for translating the outline of a character into electrical impulses, an optical system movable over the character, said system comprising a combination of a lamp and a light sensitive cell responsive to light therefrom, means for freely moving said system in two dimensions, and electric means for rendering variations of light by the character on the cell manifest to the sense of touch.

7. In a device for translating the outline of a character into electrical impulses, the combination of a light sensitive medium mounted on a carriage adapted to move over the character along an irregular path, said system being energized by a source of current and electromagnetic means connected to the source for indicating changes in said light medium.

8. In an instrument enabling the blind to read characters, means for producing a fine pencil of light adapted to move over the characters along an irregular path to intersect the character at various points, means for translating the effect of the intersections on the light into responses intelligible to the blind, and means under the control of the reader for selecting the points of intersection.

9. Apparatus for enabling the blind to decipher indicia comprising a tracer freely movable over the indicia in two dimensions, a support for said tracer, a guide fixed in one dimension relatively to said support for guiding said tracer in one dimension, a guide movable relatively to said support, and means responsive to movement of said tracer for manifesting said indicia.

10. In combination, a character, means for scanning predetermined portions of the character by light, means for translating the light effects into impulses of another form, said portions being selected by a tracer operable within a space whose dimensions correspond to one or more dimensions of the character.

11. In combination, a primary impression and means for translating the impression into a secondary impression, said means comprising a combined lamp and light responsive device universally movable in two dimensions to traverse the whole area of the impression, said means being arranged to produce substantially the same manifestation when crossing the impression in either dimension.

12. In combination, a character, means for scanning along a devious path predetermined portions of the character with a single light ray of constant characteristics, whereby reflected impulses are derived, means for controlling the rate of scanning through an amplifying linkage and for translating the impulses into mechanical vibrations.

13. In apparatus for indicating the absence of diffused or reflected light over a surface, portions of which are lighted, a device responsive to reflected light and adapted to move over said surface along an irregular path, means for indicating the changes in the device, said means being adapted to move over a guide of fixed dimension, and further means for relating the movements of the light responsive device and the indicator in accordance with a predetermined ratio.

14. In an instrument enabling the blind to read, a plurality of rows of characters parallelly disposed on a surface, a fine pencil of light rays adapted to move along an irregular path over individual portions of every character and every row, means for imparting restricted movement to the light pencil over the character in one dimension and further means for enabling a parallel transition of the light beam from row to row whereby orientation of the reading matter is automatically effected.

15. Apparatus for translating light impressions into undulations of another energy form, comprising a mechanical linkage of interconnected members, a source of light and a light responsive element located at the intersection of two of the members and positioned directly over the impression and movable along an irregular path, means associated with the remaining members for indicating changes in the light responsive element and for subjecting the source of light to a vertical movement over each impression.

16. In a device for enabling the blind to read, reading matter, a scanning light mounted on a pantograph and operatively associated with said reading matter through a control exercised by the reader, said pantograph being secured to a member capable of reciprocation and means for translating the variations of light absorbed by the reading matter into a form intelligible to the blind.

17. In an instrument enabling the blind to read ordinary type, a row of characters, means for producing a fine pencil of light rays adapted to move over individual portions of every character whereby the intersected outline causes the ray to be broken into impulses, means for translating the impulses into a form of energy intelligible to the blind and means whereby the latter may control the movement of light pencil over each portion of the character and each row.

18. In an instrument enabling the blind to read, a character, means for producing a fine pencil of light adapted to move over the character in a direction to intercept the outline at various points, means for translating the interceptions into responses suitable to the blind and means for selecting the points of intersection, said means comprising a guide member with parallelly extending grooves spaced apart a distance representative of the dimension of character.

19. In combination, a plurality of parallelly spaced rows of characters, means for subjecting each row to a light beam, means for translating the light effects into impulses of another form, means for moving the light beam from row to row and permitting its travel over the whole compass containing each row, said last-mentioned means comprising a device for deriving a parallel movement and operatively associated with the light beam, constraining the latter to move only in directions parallel to those defined by the first row.

Signed by me at Boston, Massachusetts this 14th day of July 1927.

ROBERT E. NAUMBURG.